May 13, 1930.  G. F. WILSON  1,758,729
METHOD AND APPARATUS FOR SEVERING ELASTIC TUBULAR ARTICLES
Filed Jan. 25, 1929  2 Sheets-Sheet 1
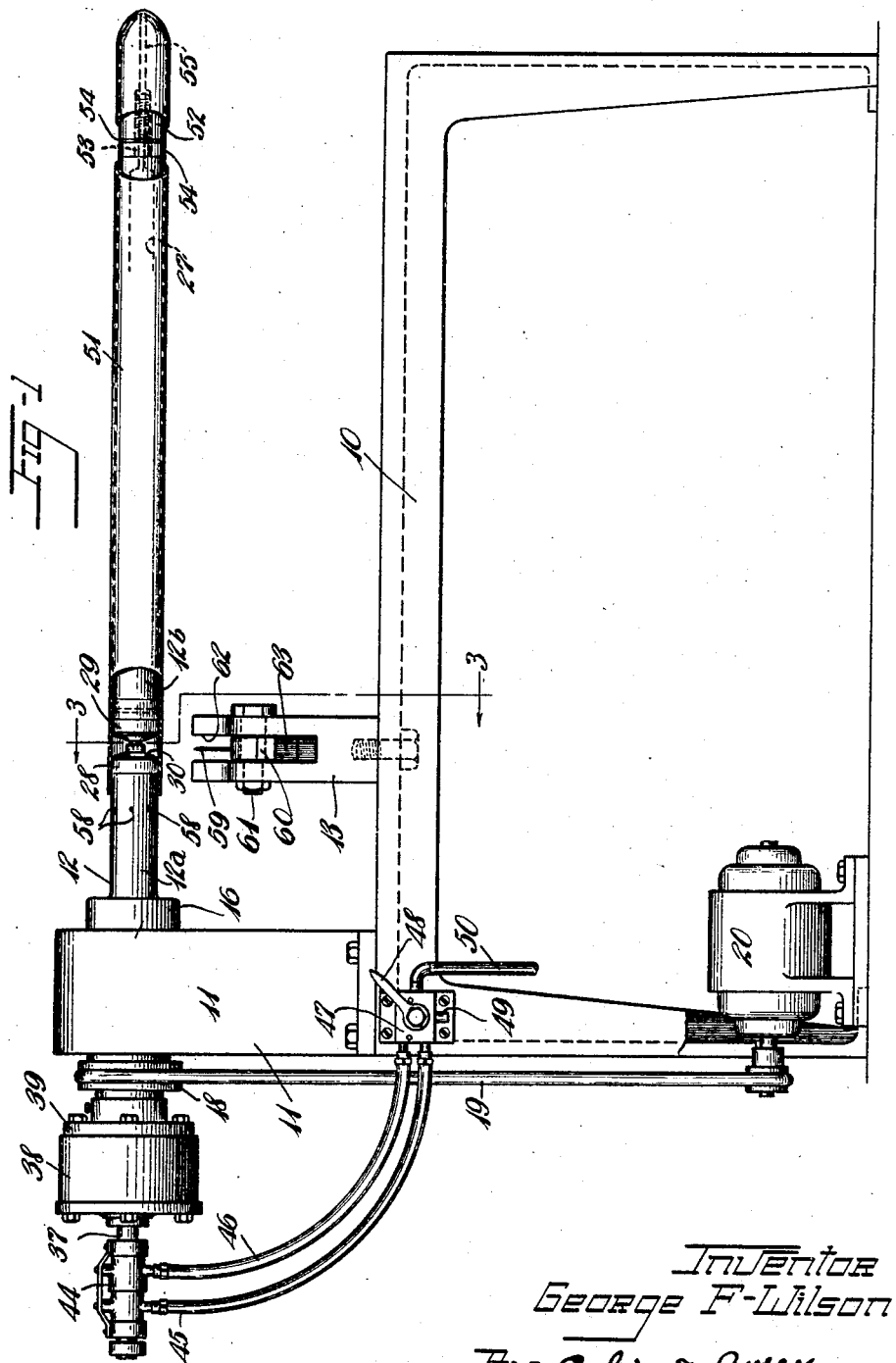

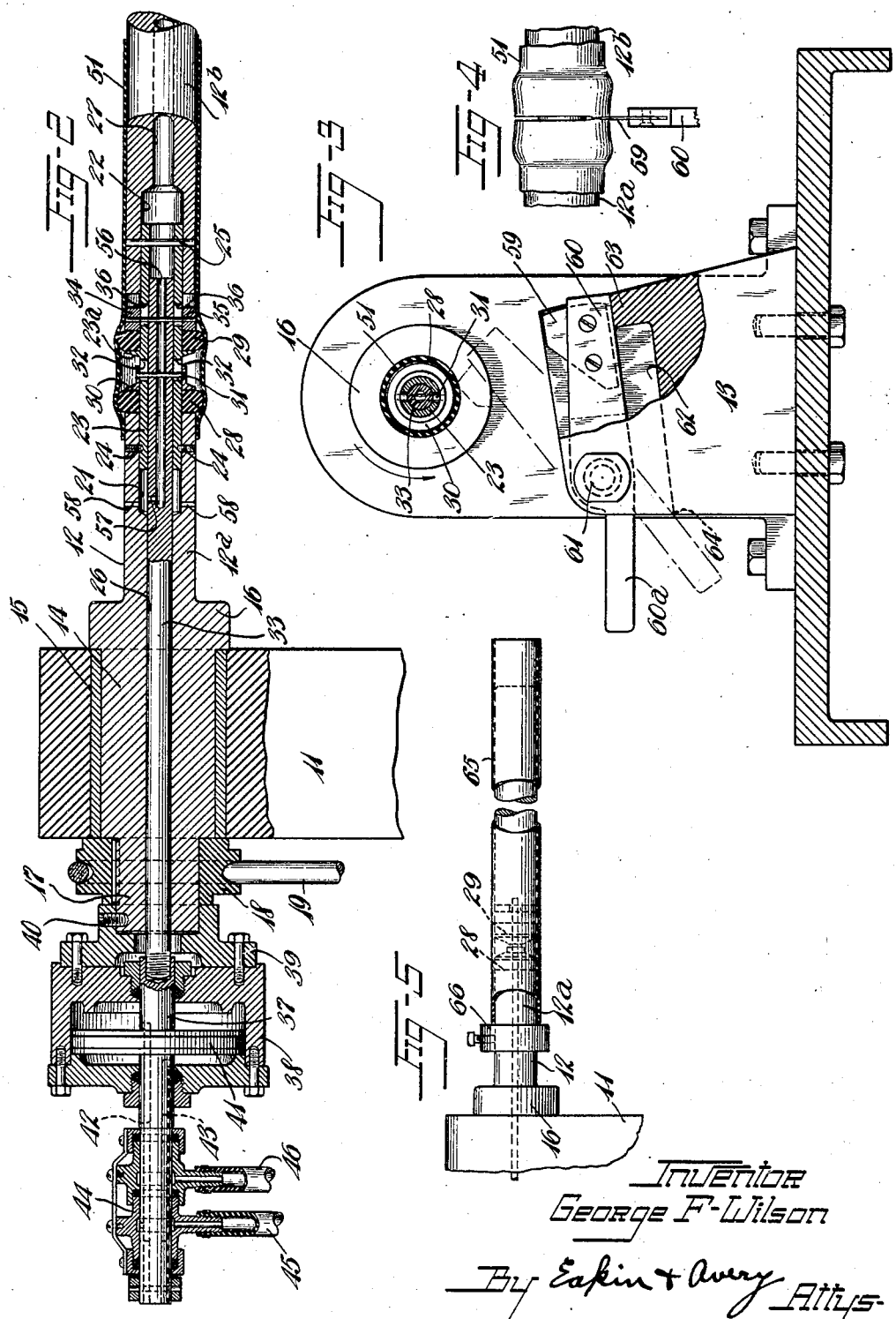

Patented May 13, 1930

1,758,729

UNITED STATES PATENT OFFICE

GEORGE F. WILSON, OF AKRON, OHIO, ASSIGNOR TO THE B. F. GOODRICH COMPANY, OF NEW YORK, N. Y., A CORPORATION OF NEW YORK

METHOD AND APPARATUS FOR SEVERING ELASTIC TUBULAR ARTICLES

Application filed January 25, 1929. Serial No. 335,052.

This invention relates to methods and apparatus for severing elastic tubular articles, and its chief objects are to obtain accuracy in the length of the finished article; to sever the article accurately in a plane perpendicular to its axis; to obviate binding of the severing tool by the material being severed; and to provide simple, rapid, and efficient procedure and mechanism for accomplishing the foregoing objects. A more specific object is to provide an improved expanding mandrel.

The invention has its primary utility in the severing of tubular rubber articles which have open ends or which may have one closed end, although at least a portion of the apparatus may be usefully employed for mounting and rotating tubes composed of rigid material.

Of the accompanying drawings:

Fig. 1 is a front elevation of apparatus embodying and adapted to carry out my invention in its preferred form, and the work mounted thereupon, a part being broken away and a part in section.

Fig. 2 is a vertical section, on a larger scale, through a portion of the apparatus shown in Fig. 1.

Fig. 3 is a section on line 3—3 of Fig. 1.

Fig. 4 is a fragmentary rear elevation of the work and severing tool during the severing operation.

Fig. 5 is a front elevation of an expanding mandrel comprising a modification of my invention, a part being broken away.

Referring to the preferred apparatus of Fig. 1, I show a frame, table, or bed 10 upon one end of which is mounted a bearing bracket or mandrel support 11 for a rotatable expanding mandrel, generally designated 12, which extends freely from said support over the bed 10, and a tool holder 13 is suitably positioned upon the bed 10 beneath the mandrel 12.

The mandrel 12 is formed with a hub-portion 14 journaled in a suitable bushing 15 in the support 11, and said hub-portion is formed at one end with a circumferential flange 16 which abuts on outer face of the support 11 and at the other end is formed with a portion 17 of reduced diameter which extends outside the support 11 and is there provided with a pulley 18 by which the mandrel is driven, through a driving belt 19, from a motor 20 or other suitable source of power.

The mandrel 12 comprises two main sections, a relatively short section $12^a$ integral with the hub-portion 14, and a relatively long section $12^b$ at the free end thereof, said sections being formed in their adjacent end portions with respective axial counterbores 21, 22, and the section $12^b$ being supported in spaced, coaxial relation with the section $12^a$ by a tubular sleeve 23 mounted in said counterbores. The sleeve 23 terminates somewhat short of the ends of said counterbores, and is secured to the section $12^a$ by set-screws 24, 24 and to the section $12^b$ by a pin 25. The mandred sections $12^a$, $12^b$ are formed with respective axial bores 26, 27 of somewhat smaller diameter than the counterbores 21, 22.

Positioned between the adjacent ends of the mandrel sections $12^a$, $12^b$ is an expansible element adapted to be expanded to frictionally engage the inner wall of tubular material mounted upon the mandrel and spanning the space between its sections $12^a$, $12^b$. The expansible element preferably comprises two members 28, 29 respectively which are spaced somewhat apart from each other so that the work may be severed between said members, thus obviating the possibility of damage to said members or to the severing tool.

Each of the expanding members 28, 29 preferably comprises a disc of elastic material such as rubber, the discs being mounted upon the sleeve 23 and having their outer peripheral faces normally disposed flush with the outer surface of the mandrel sections $12^a$, $12^b$. The member 28 abuts the free end of mandrel section $12^a$ and has its opposite face engaged by a flanged collar 30 slidably mounted upon the sleeve 23 and secured by a pin 31 which passes through slots 32, 32 formed in the sleeve 23 at diametrically opposite points thereof, to a reciprocable rod 33 mounted in the axial bore 26 of the mandrel section $12^a$ and extending most of the way through the tubular sleeve 23. In like manner the disc 29 abuts a radial flange $23^a$ formed on the sleeve 23 and has its opposite face engaged by a collar 34 slidably mounted upon said sleeve and secured to the rod 33 by a pin 35 which extends through respective slots 36, 36 formed in opposite sides of the sleeve 23.

The arrangement is such that axial movement of the rod 33 in one direction, (the left as viewed in Figs 1 and 2), draws the collars 30, 34 against the respective discs 28, 29 and places them under lateral compression, with the result that their mass is displaced in a radially outward direction and their diameters thereby uniformly increased. Thus the discs 28, 29 because of their radial expansion, are adapted frictionally to engage the inner wall of any circumscribing article.

For manipulating the rod 33 to expand and release the discs 28, 29, the opposite end of the rod from the end to which the collars 30, 34 are secured extends beyond the hub-portion 17 and is there secured to the coaxial piston rod 37 of a double-acting fluid-pressure cylinder 38 which is secured to the hub-portion 17 by means of an adapter plate 39 which fits over the end portion of the member 17 and is secured thereto by a set screw 40. Thus the fluid pressure cylinder rotates with the mandrel 12 when the latter is driven.

For admitting pressure fluid selectively to opposite sides of the piston 41 of the fluid pressure cylinder 38, as the latter is rotated, and for discharging pressure fluid therefrom, the piston rod 37 is constructed to such length as to extend through and beyond the rear wall of the cylinder 38 and is formed therein with two parallel, longitudinal, internal passages 42, 43 which open onto the surface of the piston rod, within the cylinder 38, at opposite sides of the piston 41, and outside the cylinder open onto the surface of the piston rod at longitudinally spaced points. A dual swivel connection 44 of known construction is mounted upon the projecting end of the piston rod 37 and connected to fluid pressure inlet and outlet pipes 45, 46, the connection 44 being so constructed and arranged as to remain stationary on the piston rod during the rotation thereof, and conduct pressure fluid from the pipes 45, 46 to the ports of the passages 42, 43 respectively of said piston rod.

The pipes 45, 46 extend to a four-way valve 47 which may be mounted for convenience upon the adjacent bed 10. The valve 47 is provided with an operating handle 48 and an exhaust port 49, and is connected by an inlet pipe 50 with a source of fluid under pressure (not shown). The arrangement is such that movement of the handle 48 in one direction admits pressure fluid to the cylinder 38 on one side of the piston 41 while venting fluid from the opposite side thereof, and the operation described is reversed when the handle is moved in the opposite direction, with the result that the discs 28, 29 are expanded and released at will while the mandrel 12 is rotating.

When the apparatus is used for severing surplus material from the open end of a tubular article having one closed end, such as the closed-end rubber tube or sleeve 51 shown in Figs. 1 and 2 of the drawings, I prefer to mount the article upon the mandrel 12 so that the free end of the latter fits snugly into the closed end-portion of the article, and thus, by varying the length of the mandrel, adapt the apparatus for the severing of articles of various lengths, the severing position remaining always at the same point longitudinally of the apparatus.

For varying the length of the mandrel 12, I provide a removable, bluntly pointed nose-portion 52 which threads onto a threaded axial stem 53 formed on the free end of the mandrel-section $12^b$, and spacer-washers 54, 54 of various widths are provided for mounting between the mandrel section $12^b$ and nose-portion 52 to vary the length of the assembled mandrel structure.

The mandrel 12 preferably is of such diameter that the tubular article 51 has a slight clearance and slides easily thereover, and entrapped air escapes between the mandrel and wall of the article. However, to provide a positive vent for entrapped air, in the event that the article 51 should fit the mandrel too closely, I form the nose-portion 52 with an axial passage 55 which communicates with the passage 27 of the mandrel-section $12^b$, and form that end of the rod 33 to which is attached the collars 30, 34 with an axial bore 56 which extends a suitable distance thereinto and communicates, through one or more radial ports 57, with the countersink 21 in the free end of the mandrel-section $12^a$ in that portion thereof not occupied by the sleeve 23. A plurality of radial ports 58, 58 through the wall of the mandrel-section $12^a$ vent the countersink 21 to the atmosphere at a point sufficiently removed from the expansible members as not to be overlain by any work on the mandrel. The arrangement is such as to vent the interior of the work to the atmosphere so that it may be fully seated upon the mandrel, thereby assuring accurate dimensions to the trimmed work.

For severing surplus material from the tube 51 I provide a sharp blade 59 mounted in one end of a lever 60 pivotally mounted near its middle at 61 in a slot 62 formed in the tool holder 13, the other end of said lever being formed as a handle $60^a$, which when depressed, raises the blade 59 into engagement with the work. The lever 60 is so balanced as normally to lie in lowered, inoperative position upon a rest 63 formed in the tool-holder 13, and the operative range of the lever is defined by a ledge 64 which the handle $60^a$ abuts at the limit of its operative movement. The tool-holder 13 is so positioned that the blade 59 is adapted to engage the work 51 between the expansible elements 28, 29, and to sever the same with a circumferential cut.

The method of operating the apparatus described is as follows. The mandrel 12 and associated parts being constantly driven by the motor 20, and the expansible members 28, 29 being in the unpressed condition shown in Fig. 1 of the drawings, a tubular, elastic article such as the closed-end rubber tube 51 is mounted upon the mandrel and slid to the left thereon until the nose-portion 52 of the mandrel fits snugly within the closed end of the article. The handle 48 of the valve 47 is then thrown to the position to admit pressure fluid to the cylinder 38 on the right hand side of its piston 41, thus causing the latter to move toward the left and assume the position shown in Fig. 2, and consequently to cause the rod 33 likewise to move to the left and draw the collars 30, 34 against the rubber discs 28, 29, with the result that the latter bulge radially outward against the inner wall of the tube 51 as is clearly shown in Figs. 2 and 4.

Because of the elasticity of the tube-structure 51, its wall is correspondingly deformed over the expansible members 28, 29 and put under circumferential tension, and to a lesser extent, under longitudinal tension which is translated, at least in part, to that portion of the work disposed between the members 28, 29.

The distended portion of the work is then moistened with water, and the handle 60ª depressed to raise the blade 59 forcibly into engagement with the work 51, as shown in gagement lines, Fig. 4, to sever the same. As the blade progresses through the elastic wall of the tube 51, in a circumferential direction as the latter rotates, the longitudinal tension of the tube causes the severed portions thereof to draw away from the blade 59, as is clearly shown in Fig. 4, with the result that there is no binding of the work upon the blade, and a clean, square-end cut is effected.

The handle 48 of the valve 47 is then thrown in reverse direction to move the rod 33 in the direction to release the lateral pressure of the expansible elements 28, 29, which thereupon contract to their normal diameter and permit the tube 51 and material severed therefrom to be slid from the rotating mandrel 12. The operations described may then be repeated.

The modified apparatus shown in Fig. 5 is adapted especially for mounting and rotating tubular articles which are open at both ends, such as the tube 65 thereon. There is no axial passage through the mandrel 12 for venting air from the article since none is necessary, and no nose-portion of adjustable length for positioning the article is required. Otherwise the modified structure is identical with the preferred structure except for the addition of a stop-collar or gauge 66 adjustably mounted upon the mandrel-section 12ª and adapted for positioning the work 65 so that a piece of proper length is produced when the work is severed between the expansible members 28, 29.

Although the apparatus is especially useful for the purpose mentioned, its applicability is in no way limited thereto since my expanding mandrel may be employed in other situations, with elastic or rigid material, either while rotating or stationary.

Other modifications may be resorted to without departing from the scope of the invention, and I do not limit my claims to the specific construction or exact procedure shown and described.

I claim:

1. The method of severing elastic tubular articles which comprises placing a region of the article under longitudinal tension, and severing the article with a circumferential cut in said region.

2. The method of severing elastic tubular articles which comprises effecting local distension of the article to place a region thereof under longitudinal tension, and then severing the article in said region.

3. A method as defined in claim 2 in which the severing of the article is effected with a circumferential cut.

4. The method of severing elastic tubular articles which comprises placing adjacent regions thereof under circumferential tension to effect longitudinal tension in the region intermediate thereto, and severing the article in the region of longitudinal tension.

5. A method as defined in claim 4 in which the article is severed with a circumferential cut.

6. The method of severing elastic tubular articles which comprises rotating the article, concurrently effecting longitudinal tension locally in a region thereof, and severing the article in the tensioned region as the article rotates.

7. The method of severing elastic tubular articles which comprises rotating the article, locally distending the article to place a region thereof under tension, and severing the article in said region as it rotates.

8. The method of severing elastic tubular articles which comprises rotating the article, locally distending adjacent regions thereof to effect longitudinal tension in the region intermediate thereto, and then severing the article in said region of longitudinal tension as the article rotates.

9. Apparatus for severing elastic tubular articles, said apparatus comprising means for placing a region of the article under longitudinal tension, and means for severing the article with a circumferential cut in said region.

10. Apparatus for severing elastic tubular articles said apparatus comprising means for locally distending the article to place a region thereof under longitudinal tension, and means for severing the article in said region of tension.

11. Apparatus as defined in claim 10 in which the severing means is so mounted and arranged as to sever the article with a circumferential line of cut.

12. In apparatus for severing elastic tubular articles, the combination of means for placing adjacent regions of the article under circumferential tension to effect longitudinal tension in the region intermediate thereto, and means for severing the article in the region of longitudinal tension.

13. In apparatus for severing elastic tubular articles, the combination of means for supporting the article, means for rotating said support, means on said support for effecting local longitudinal tension in the article as it is so supported and rotated, and a cutter adapted to be moved into engagement with the tensioned region of the article as it rotates.

14. In apparatus for severing elastic tubular articles, the combination of means for supporting the article, means for rotating said support, means on said support for locally distending the article to place a region thereof under tension, and a cutter adapted to be moved into severing relation to the tensioned zone of the article.

15. In apparatus for severing elastic tubular articles, the combination of a support for the article, means for rotating said support, means on said support for locally distending adjacent regions of the article to effect longitudinal tension in the region intermediate thereto, and a cutter adapted to sever the article in its region of longitudinal tension.

16. In apparatus for severing elastic tubular articles, the combination of an expansible mandrel upon which the work is mounted, means for rotating said mandrel, means for expanding the mandrel as it is so rotated, and means for severing the work as it is rotated by said mandrel.

In witness whereof I have hereunto set my hand this 15th day of January, 1929.

GEORGE F. WILSON.